United States Patent
Kosaka et al.

(10) Patent No.: US 9,701,069 B2
(45) Date of Patent: *Jul. 11, 2017

(54) METHOD FOR MANUFACTURING COMPOSITE MATERIAL

(71) Applicant: Teijin Limited, Osaka-shi, Osaka (JP)

(72) Inventors: Kazunari Kosaka, Tokyo (JP); Takuro Kitamura, Tokyo (JP); Yasuyuki Kondo, Matsuyama (JP); Daisuke Kobayashi, Matsuyama (JP)

(73) Assignee: Teijin Limited, Osaka-Shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/429,942

(22) PCT Filed: Sep. 19, 2013

(86) PCT No.: PCT/JP2013/076165
§ 371 (c)(1),
(2) Date: Mar. 20, 2015

(87) PCT Pub. No.: WO2014/046296
PCT Pub. Date: Mar. 27, 2014

(65) Prior Publication Data
US 2015/0239182 A1     Aug. 27, 2015

(30) Foreign Application Priority Data

Sep. 21, 2012  (JP) ................................ 2012-208368
May 15, 2013   (JP) ................................ 2013-103098

(51) Int. Cl.
| | |
|---|---|
| *B27N 3/10* | (2006.01) |
| *B29C 70/46* | (2006.01) |
| *C08J 5/04* | (2006.01) |
| *B29C 70/12* | (2006.01) |
| *B29C 43/00* | (2006.01) |
| *B29K 67/00* | (2006.01) |
| *B29K 79/00* | (2006.01) |
| *B29K 105/00* | (2006.01) |
| *B29K 307/04* | (2006.01) |

(52) U.S. Cl.
CPC ............ *B29C 70/46* (2013.01); *B29C 43/003* (2013.01); *B29C 70/12* (2013.01); *C08J 5/042* (2013.01); *B29K 2067/003* (2013.01); *B29K 2067/006* (2013.01); *B29K 2079/08* (2013.01); *B29K 2105/0085* (2013.01); *B29K 2307/04* (2013.01); *C08J 2367/02* (2013.01)

(58) Field of Classification Search
USPC ........ 264/257, 320, 328.16, 331.11; 524/495
See application file for complete search history.

(56) References Cited

U.S. PATENT DOCUMENTS

| | | | |
|---|---|---|---|
| 3,900,444 A | * | 8/1975 | Racky ................. C08K 5/5313 524/126 |
| 5,677,057 A | | 10/1997 | Tashiro et al. |
| 6,066,395 A | | 5/2000 | Miyoshi et al. |
| 6,660,789 B2 | * | 12/2003 | Uno ........................ C08L 67/02 524/267 |
| 7,754,323 B2 | | 7/2010 | Murai et al. |
| 2002/0188073 A1 | | 12/2002 | Uno et al. |
| 2003/0069339 A1 | | 4/2003 | Takenaka et al. |
| 2006/0202391 A1 | | 9/2006 | Nishida et al. |
| 2007/0197736 A1 | * | 8/2007 | Hashiba ................. B27N 3/002 525/411 |
| 2009/0004453 A1 | | 1/2009 | Murai et al. |
| 2009/0208721 A1 | | 8/2009 | Tsuchiya et al. |
| 2010/0261025 A1 | | 10/2010 | Miyamoto et al. |
| 2011/0224385 A1 | | 9/2011 | Shoji et al. |
| 2013/0344282 A1 | | 12/2013 | Yagi et al. |
| 2014/0186584 A1 | | 7/2014 | Arakawa et al. |

FOREIGN PATENT DOCUMENTS

| | | | |
|---|---|---|---|
| EP | 2360208 A1 | | 8/2011 |
| JP | H05-220746 A | | 8/1993 |
| JP | H09-286036 A | | 11/1997 |
| JP | H10-7813 A | | 1/1998 |
| JP | H11-81146 A | | 3/1999 |
| JP | 2002-192507 A | * | 7/2002 |
| JP | 2002-322352 A | | 11/2002 |
| JP | 2002-356611 A | | 12/2002 |
| JP | 2006-291214 A | | 10/2006 |
| JP | 2008-49702 A | | 3/2008 |
| JP | 2008-50597 A | | 3/2008 |
| JP | 2008-50598 A | | 3/2008 |
| JP | 2009-149018 A | | 7/2009 |
| JP | 2010-24439 A | | 2/2010 |
| JP | 2011-84038 A | | 4/2011 |
| JP | 2011-178890 A | | 9/2011 |

(Continued)

OTHER PUBLICATIONS

Jan. 14, 2014—International Search Report—Intl App PCT/JP2013/076165.
Aug. 3, 2015—(EP)—Supplementary Search Report—App 13838816.
Oct. 17, 2016—(EP) Examination Report—App 13838816.0.

*Primary Examiner* — Tae H Yoon
(74) *Attorney, Agent, or Firm* — Banner & Witcoff, Ltd.

(57) ABSTRACT

Disclosed is a method for manufacturing a composite material, which includes performing press molding of a fiber matrix structure including reinforcing fibers and a matrix resin mainly including a polyester-based resin having a crystallization temperature of 185° C. or lower. Furthermore, the polyester-based resin is preferably a polyester-based copolymer. In addition, it is preferred that the matrix resin includes a carbodiimide, and that the carbodiimide has a cyclic structure. Moreover, it is preferred that the press molding is cold pressing in which a die temperature is 170° C. or lower; that the reinforcing fibers are carbon fibers; and that the discontinuous fibers are randomly oriented in the structure.

12 Claims, No Drawings

(56) References Cited

FOREIGN PATENT DOCUMENTS

| JP | 2011-241338 A | 12/2011 |
|---|---|---|
| JP | 2011-256267 A | 12/2011 |
| JP | 2012-25841 A | 2/2012 |
| JP | 2012-219168 A | 11/2012 |
| WO | 97/23670 | 7/1997 |
| WO | 2007-097436 A1 | 8/2007 |
| WO | 2007/097436 A1 | 8/2007 |
| WO | 2010-071213 A1 | 6/2010 |
| WO | 2012/117593 A1 | 9/2012 |
| WO | 2013-035705 A1 | 3/2013 |

* cited by examiner

METHOD FOR MANUFACTURING COMPOSITE MATERIAL

CROSS REFERENCE TO RELATED APPLICATIONS

This is a U.S. National Phase Application under 35 U.S.C. §371 of International Application No. PCT/JP2013/076165, filed Sep. 19, 2013, which claims priority to Japanese Patent Application Nos. 2012-208368 and 2013-103098, filed on Sep. 21, 2012 and May 15, 2013, respectively, the entire disclosures of which are incorporated herein by reference.

TECHNICAL FIELD

The present invention relates to a method for manufacturing a composite material, and in more detail, the present invention relates to a method for manufacturing a composite material including reinforcing fibers and a matrix, which while having high physical properties, is excellent in moldability.

BACKGROUND ART

Fiber-reinforced composite materials are widely adopted as a material that is lightweight and excellent in high physical properties because fragility of a matrix can be reinforced with fibers having high strength.

However, molded articles including only a synthetic resin or a metal can be molded easily and quickly by injection molding or press molding, whereas fiber-reinforced composite materials encountered such a problem that moldability in a short time or complicated moldability is poor due to the presence of reinforcing fibers with poor fluidity contained therein.

In particular, in the case of using a thermosetting resin for the matrix resin, in addition to the matter that it takes a time for integrating the matrix resin with fibers, a time for setting the matrix resin was needed. Then, though fiber-reinforced composite bodies using a thermoplastic resin in place of the conventional thermosetting resin have been attracting attention, there was encountered such a problem that in general, the resin viscosity during the process is high as compared with the thermosetting resin, and thus, it takes a more time for impregnating the fibers with the resin.

As a method for solving these problems, for example, in the thermoplastic stamping molding method, there is disclosed a method in which chopped fibers having been previously impregnated with a resin are put into a die, and the fibers and the resin are allowed to flow within the die, thereby obtaining a product shape (see Patent Document 1 and the like). However, since it is required to secure high fluidity within the die, there were encountered such problems that a thin-walled product cannot be made, and that control is difficult.

In addition, there is also proposed a technology of subjecting thermoplastic resin pellets including reinforcing fibers to injection molding (see Patent Document 2 and the like); however, there was encountered such a problem that the length of the pellet is an upper limit of the fiber length in the production, and that the reinforcing fibers are cut during the kneading process, and thus, a thorough reinforcing effect is not obtained.

Furthermore, all of the above-described both methods encountered such a problem that the fibers are apt to be oriented, and the reinforcing effect presents strongly only in one direction, and thus, an isotropic material is hardly obtained.

Then, Patent Document 3 discloses a production method of press molding a fiber matrix structure including reinforcing fibers and a thermoplastic resin, and specifically, a polyamide resin or the like is used as the matrix resin. However, in the case of using a usual resin as the matrix resin, for example, in the case of using an amorphous resin, there was encountered such a problem that the chemical resistance to an alkali, chlorine, or the like is poor. Meanwhile, in the case of using a crystalline resin, the general chemical resistance is enhanced; however, for example, in the case of using a polyamide resin, there were encountered such problems that the acid resistance is poor, and that the dimensional change to be caused due to water absorption is large.

(Patent Document 1) JP-A-11-81146
(Patent Document 2) JP-A-9-286036
(Patent Document 3) JP-A-2011-178890

SUMMARY OF INVENTION

Problems to Be Solved by Invention

The present invention is to provide a method for manufacturing a composite material reinforced with fibers, which is excellent in physical properties and capable of being manufactured in a short time.

Means for Solving the Problems

A method for manufacturing a composite material according to the present invention, includes performing press molding of a fiber matrix structure including reinforcing fibers and a matrix resin which mainly includes a polyester-based resin having a crystallization temperature of 185° C. or lower.

Furthermore, it is preferred that the polyester-based resin is a polyester copolymer; that the polyester-based resin is a resin mainly including a polybutylene terephthalate component; and that the polyester-based resin is a copolymer resin including a terephthalic acid component and an isophthalic acid component.

In addition, it is preferred that the matrix resin includes a carbodiimide, and that the carbodiimide has a structure represented by the following chemical formula (1).

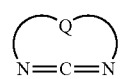

(1)

(In the formula, Q is a divalent, trivalent, or tetravalent binding bond that is an aliphatic group, an alicyclic group, an aromatic group, or a combination thereof, which may include a hetero atom.)

Furthermore, it is preferred that the press molding is cold pressing in which a die temperature is 170° C. or lower; and that a temperature of the fiber matrix structure at the time of the press molding is a melting point of the matrix resin or higher, and moreover, it is preferred that preliminary press molding is performed in advance prior to the cold pressing.

Then, it is preferred that the reinforcing fibers are carbon fibers; that the reinforcing fibers are fibers mainly including discontinuous fibers; and that a part of the reinforcing fibers is a unidirectional fiber sheet, and furthermore, it is preferred that the discontinuous fibers are randomly oriented in the structure.

In addition, it is preferred that the matrix resin before the press molding is in a granular or film-like form.

A composite material of another aspect of the present invention is a composite material resulting from the method for manufacturing a composite material according to the present invention as described above.

Effect of Invention

In accordance with the present invention, a method for manufacturing a composite material reinforced with fibers, which is excellent in physical properties and capable of being manufactured in a short time, is provided.

EMBODIMENTS FOR CARRYING OUT INVENTION

In a method for manufacturing a composite material according to the present invention, it is essential to press mold a fiber matrix structure including reinforcing fibers and a matrix which mainly includes a polyester-based resin having a crystallization temperature of 185° C. or lower.

Here, in the present invention, it is necessary that the resin which is used for the matrix is a resin mainly including a polyester-based resin having a crystallization temperature of 185° C. or lower. Furthermore, the crystallization temperature is preferably 180° C. or lower, and a lower limit value thereof is preferably 140° C. or higher. The crystallization temperature is most preferably in the range of from 150° C. to 170° C. The crystallization temperature as referred to herein means a temperature at which the resin is crystallized through measurement under a temperature dropping condition. In the case where the crystallization temperature is too high, moldability between the matrix resin and the reinforcing fibers in the composite material is poor at the time of press working, and thus, a uniform composite material may not be obtained. Conversely, in the case where the crystallization temperature is too low, even if the reinforcing fibers are used, a problem that physical properties of the composite material, such as heat resistance, are lowered is caused. In order to get a polyester-based resin having such a crystallization temperature, the polyester-based resin is preferably a copolymer.

Furthermore, the polyester-based resin which is used for the matrix in the present invention is preferably a polymer or a copolymer resulting from a condensation reaction between an aromatic dicarboxylic acid or a reactive derivative thereof and a diol or an ester derivative thereof as main components.

As the aromatic dicarboxylic acid as referred to herein, a compound selected from aromatic dicarboxylic acids such as terephthalic acid, isophthalic acid, orthophthalic acid, 1,5-naphthalenedicarboxylic acid, 2,6-naphthalenedicarboxylic acid, 4,4'-biphenyldicarboxylic acid, 4,4'-biphenyl ether dicarboxylic acid, 4,4'-biphenylmethane dicarboxylic acid, 4,4'-biphenylsulfone dicarboxylic acid, 4,4'-biphenylisopropylidene dicarboxylic acid, 1,2-bis(phenoxy)ethane-4,4'-dicarboxylic acid, 2,5-anthracenedicarboxylic acid, 2,6-anthracenedicarboxylic acid, 4,4'-p-terphenylene dicarboxylic acid, and 2,5-pyridinedicarboxylic acid; diphenylmethane dicarboxylic acid, diphenyl ether dicarboxylic acid, and β-hydroxyethoxybenzoic acid is suitably used, and particularly, terephthalic acid, isophthalic acid, and 2,6-naphthalenedicarboxylic acid may be preferably used. The aromatic dicarboxylic acid may be used in admixture of two or more kinds thereof. Incidentally, it is also possible to mix and use at least one compound of aliphatic dicarboxylic acids such as adipic acid, azelaic acid, sebacic acid, and dodecane diacid and alicyclic dicarboxylic acids such as cyclohexanedicarboxylic acid, together with the foregoing dicarboxylic acid so long as an amount thereof is small.

In addition, examples of the diol that is a component of the polyester resin include aliphatic diols such as ethylene glycol, propylene glycol, butylene glycol (1,4-butanediol), hexylene glycol, neopentyl glycol, pentamethylene glycol, hexamethylene glycol, decamethylene glycol, 2-methyl-1,3-propanediol, diethylene glycol, and triethylene glycol; alicyclic diols such as 1,4-cyclohexanedimethanol; diols containing an aromatic ring, such as 2,2-bis(β-hydroxyethoxyphenyl)propane; and mixtures thereof; and the like. Furthermore, at least one long-chain diol having a molecular weight of from 400 to 6,000, namely polyethylene glycol, poly-1,3-propylene glycol, polytetramethylene glycol, or the like, may be copolymerized so long as an amount thereof is small.

Then, the polyester resin in the present invention is preferably a polyester-based copolymer, and preferably a resin in which the aromatic dicarboxylic acid component or the diol component is constituted of two or more components. For example, it is preferred that the aromatic dicarboxylic acid component is one containing a terephthalic acid component and an isophthalic acid component; or that the diol component is one containing 1,4-butanediol and ethylene glycol.

More specifically, when a preferred polyester copolymer is exemplified, a copolymerization polyester resin such as polyethylene isophthate/terephthalate and polybutylene terephthalaate/isophthate is particularly preferred.

In particular, from the standpoints of physical properties and moldability thereof, the polyester-based resin is preferably one mainly including a polybutylene terephthalate component. The polyester-based resin is more preferably a polybutylene terephthalate/isophthalate copolymer, and most preferably a copolymer of terephthalic acid and isophthalic acid with 1,4-butanediol. More specifically, the polyester-based resin is preferably one resulting from polycondensation of terephthalic acid or an ester-forming derivative thereof and isophthalic acid or an ester-forming derivative thereof with 1,4-butanediol or an ester-forming derivative thereof by a generally known method.

Furthermore, a content of the isophthalic acid component (hereinafter referred to as "isophthalic acid content") in the whole of the dicarboxylic acid components in the above-described terephthalate/isophthalate copolymer is preferably from 2 to 50 mol %. More preferably, taking into consideration a balance between the moldability and the physical properties, the isophthalic acid content is preferably 30 mol % or less, and more preferably in the range of from 5 to 20 mol %. When the isophthalic acid content is too low, the moldability tends to be lowered, whereas it is too high, the physical properties or heat resistance tends to be lowered.

Then, the polyester-based resin which is most preferably used in the present invention is a polybutylene terephthalate-based resin. This may be only the polybutylene terephthalate/isophthalate copolymer as described above, or may be a mixture of a polybutylene terephthalate resin and a polybutylene terephthalate/isophthalate copolymer, and a mixture of two kinds of polybutylene terephthalate/isophthalate copolymers having a different isophthalic acid content from each other may also be used. In all of these cases, it is preferred that the isophthalic acid content in the component is in the same range as that in the isophthalic acid content of the terephthalate/isophthalate copolymer as described above.

Although an intrinsic viscosity of the polyester-based resin which is used in the present invention is not particularly limited, in general, it is preferably from 0.50 to 1.50. The intrinsic viscosity is more preferably in the range of from 0.60 to 1.40, and most preferably in the range of from 0.70 to 1.35.

In addition, a terminal group structure of the polyester-based resin which is used in the present invention is not particularly limited, and in addition to the case where proportions of a hydroxyl group and a carboxyl group in the terminal group are substantially the same amount, the case where the proportion of one side is larger may be adopted. In addition, the terminal groups may also be sealed by, for example, allowing a compound having reactivity with those terminal groups to react.

Such a polyester-based resin can be, for example, produced by polymerizing the dicarboxylic acid component and the diol component in the presence of a specified titanium-based catalyst while heating and discharging water or a lower alcohol formed as a by-product outside the system, according to the ordinary way.

Furthermore, in the present invention, it is preferred that the resin which is used for the matrix includes an aromatic polycarbonate resin in addition to the matrix resin mainly including a polyester-based resin.

A content of the aromatic polycarbonate in the matrix resin is smaller than the amount of the polyester-based resin as the main component, and furthermore, it is preferably from 10 to 45% by weight of the matrix resin component. When the aromatic polycarbonate that is hardly crystalline and amorphous is added in the foregoing content to the polyester-based resin which is easily crystalline as the main component, in spite of a base material having excellent moldability, a composite material that is excellent in not only physical properties but also surface appearance can be obtained.

Examples of the aromatic polycarbonate resin which is preferably used in the present invention may include a product resulting from a reaction between a divalent phenol and a carbonate precursor. It is possible to obtain such an aromatic polycarbonate resin by a reaction method such as an interfacial polymerization method, a melt ester interchange method, a solid phase ester interchange method of carbonate prepolymer, and a ring-opening polymerization method of cyclic carbonate compound.

Representative examples of the divalent phenol which is used for such a method include hydroquinone, resorcinol, 4,4'-biphenol, 1,1-bis(4-hydroxyphenyl)ethane, 2,2-bis(4-hydroxyphenyl)propane (generally called bisphenol A), 2,2-bis(4-hydroxy-3-methylphenyl)propane, 2,2-bis(4-hydroxyphenyl)butane, 1,1-bis(4-hydroxyphenyl)-1-phenylethane, 1,1-bis(4-hydroxyphenyl)cyclohexane, 1,1-bis(4-hydroxyphenyl)-3,3,5-trimethylcyclohexane, 2,2-bis(4-hydroxyphenyl)pentane, 4,4'-(p-phenylenediisopropylidene)diphenol, 4,4'-(m-phenylenediisopropyilidene)diphenol, 1,1-bis(4-hydroxyphenyl)-4-isopropylcyclohexane, bis(4-hydroxyphenyl) oxide, bis(4-hydroxyphenyl) sulfide, bis(4-hydroxyphenyl) sulfoxide, bis(4-hydroxyphenyl) sulfone, bis(4-hydroxyphenyl) ketone, bis(4-hydroxyphenyl) ester, bis(4-hydroxy-3-methylphenyl) sulfide, 9,9-bis(4-hydroxyphenyl) fluorenone, 9,9-bis(4-hydroxy-3-methylphenyl) fluorenone, and the like. The divalent phenol is preferably a bis(4-hydroxyphenyl)alkane, and above all, bisphenol A (hereinafter sometimes abbreviated as "BPA") is most preferred and used for various purposes from the standpoint of impact resistance.

In addition, the polycarbonate resin may be a resin including a polycarbonate-polydiorganosiloxane copolymer which includes an organosiloxane block.

A molecular weight of the aromatic polycarbonate resin is not specified; however, when the molecular weight is less than 10,000, the strength or the like is lowered, whereas when it is more than 50,000, the molding workability is lowered, and thus, the molecular weight is preferably from 10,000 to 50,000, more preferably from 12,000 to 40,000, and still more preferably from 15,000 to 35,000 in terms of a viscosity average molecular weight. In addition, the aromatic polycarbonate resin may be used in admixture of two or more kinds thereof. In this case, it is also possible to mix an aromatic polycarbonate resin whose viscosity average molecular weight falls outside the foregoing range.

Then, in the present invention, it is preferred to use the aromatic polycarbonate resin as described above in combination with the polyester-based resin that is the main component of the matrix resin. Furthermore, as described previously, this polyester-based resin is preferably a copolymer.

In the case of using a combination of the aromatic polycarbonate resin and the polyester-based resin as the matrix resin that is a preferred embodiment of the present invention, in addition of an enhancement of the moldability, in particular, an effect that the surface appearance of the composite material is enhanced is brought. Furthermore, the matter that the polyester-based resin is a copolymerization resin, and particularly, the aromatic dicarboxylic acid component is one including a terephthalic acid component and an isophthalic acid component is preferred from the viewpoint of an enhancement of the surface appearance.

Furthermore, it is also preferred to jointly use an elastomer in the matrix resin which is used in the present invention. By jointly using the elastomer, the matrix resin becomes soft, and the moldability at the time of press molding is enhanced. In addition, physical properties of the final composite material, such as heat resistance, may be enhanced. As the elastomer which may be used, a thermoplastic resin elastomer is preferred, and an acrylic elastomer or a polyester-based elastomer is more preferred.

In addition, it is preferred to further add at least one compound selected from carbodiimide compounds, acrylic compounds, epoxy compounds, and oxazoline compounds to the matrix resin of the present invention as described above. In the case of adding such a compound, the terminal of a polymer constituting the matrix resin is blocked, and the physical properties of a finally obtained fiber resin composite body are enhanced.

In particular, in the method for manufacturing a composite material of the present invention, it is preferred that a carbodiimide is contained in the matrix as described above. In the case of using a carbodiimide compound, the terminal of a polymer constituting the matrix resin is blocked, and the physical properties of a finally obtained fiber resin composite body are enhanced. In particular, it is preferred that the carbodiimide is a cyclic carbodiimide.

Incidentally, in this most preferred embodiment of the present invention, the matter that the cyclic carbodiimide is contained includes not only the case where only an unreacted, isolated cyclic carbodiimide is present in the matrix resin, but also an embodiment in which when the cyclic carbodiimide is mixed in the matrix resin, a heat treatment is performed. That is, an embodiment in which pellets including the cyclic carbodiimide and the matrix resin resulting from, for example, melt kneading, in advance prior to mixing in the fibers are used is also included in the present invention. Then, in the case where the cyclic carbodiimide and the matrix resin are melt kneaded in advance and then used in this way, the terminal of the polymer constituting the matrix resin is already blocked with the cyclic carbodiimide.

In the present invention, the reinforcing fibers are present in the matrix resin, and a lot of fine interfaces are present between a lot of the matrix resins and the reinforcing fibers. For that reason, it may be considered that an effect obtained by adding such a carbodiimide is remarkably revealed.

Then, above all, the cyclic carbodiimide which is used in the preferred embodiment of the present invention is a carbodiimide compound having a cyclic structure. Furthermore, the carbodiimide compound is preferably a carbodiimide compound including plural cyclic structures, particularly two cyclic structures. Examples of the cyclic structure include one having one carbodiimide group (—N=C=N—), in which the first nitrogen and the second nitrogen are bound to each other via a binding group. Then, it is preferred to have only one carbodiimide group in one cyclic structure. The atom number in the cyclic structure is preferably from 8 to 50, more preferably 30 or less, and most preferably from 10 to 20.

The atom number in the cyclic structure as referred to herein means a number of atoms directly constituting the cyclic structure, and for example, in the case of an 8-membered ring, the atom number is 8, and in the case of a 50-membered ring, the atom number is 50. When the atom number in the cyclic structure is too small, the stability of the cyclic carbodiimide compound is lowered, whereby storage and use tend to become difficult. In addition, when the atom number is too large, the synthesis of the compound becomes difficult, and the costs increase. In addition, a molecular weight of the cyclic carbodiimide compound is preferably from 100 to 1,000, and more preferably from 100 to 750.

According to a particularly preferred embodiment of the present invention, by using such a cyclic carbodiimide, it has become possible to secure a particular favorable working environment in which as compared with a general linear carbodiimide compound, an isocyanate group is hardly liberated, and an odor that is peculiar to a liberated isocyanate compound is scarcely generated. In addition, the terminal of the polymer constituting the matrix resin is blocked with the cyclic carbodiimide compound, and the matrix resin thickens and reveals excellent moldability with an enhanced die filling ratio at the time of press molding. In particular, in the present invention, though a polyester resin having a carboxyl group in the terminal thereof is essential as the matrix resin, in the case where the carbodiimide compound is a polyfunctional cyclic carbodiimide in this way, the moldability enhancing effect is especially remarkable.

In addition, when the cyclic structure of the preferred carbodiimide is mentioned more specifically, a cyclic structure represented by the following chemical formula (1) is preferred.

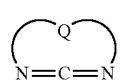

(1)

In the formula, Q is a divalent, trivalent, or tetravalent binding bond that is an aliphatic group, an alicyclic group, an aromatic group, or a combination thereof, which may contain a hetero atom or a substituent. Among the valences of this binding group, the two valences are used for the purpose of forming the cyclic structure. In the case where Q is a trivalent or tetravalent binding group, it is bound to the polymer or other cyclic structure via a single bond, a double bond, an atom, or an atomic group.

The binding group is preferably a divalent, trivalent, or tetravalent aliphatic group having from 1 to 20 carbon atoms, a divalent, trivalent, or tetravalent alicyclic group having from 3 to 20 carbon atoms, a divalent, trivalent, tetravalent aromatic group having from 5 to 15 carbon atoms, or a combination thereof. As the binding group, one having the carbon number necessary for forming the cyclic structure is selected. Examples of the combination include structures such as an alkylene-arylene group in which an alkylene group and an arylene group are bound to each other, and the like.

Each of the aliphatic group, the alicyclic group, and the aromatic group each constituting the binding group may contain a hetero atom or a substituent. The hetero atom refers to O, N, or P. Examples of the substituent include an alkyl group having from 1 to 20 carbon atoms, an aryl group having from 6 to 15 carbon atoms, a halogen atom, a nitro group, an amide group, a hydroxyl group, an ester group, an ether group, an aldehyde group, and the like. In the present invention, examples of the halogen atom include a chlorine atom, a bromine atom, and an iodine atom.

A compound in which Q is tetravalent, and one carbodiimide group is present in each of the two cyclic structures is preferred. That is, the cyclic carbodiimide is preferably a cyclic carbodiimide compound that is a compound having two cyclic structures, in which one carbodiimide group is present in each one cyclic structure.

In addition, the cyclic carbodiimide is more preferably a compound represented by the following chemical (2).

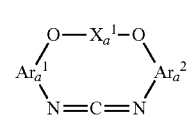

(2)

In the formula, $X_a^1$ is an alkylene group having preferably from 1 to 20 carbon atoms, and more preferably from 1 to 10 carbon atoms. Examples of the alkylene group include a methylene group, an ethylene group, a trimethylene group, a tetramethylene group, and the like.

In the formula, each of $Ar_a^1$ and $Ar_a^2$ is independently an optionally substituted arylene group having from 5 to 15 carbon atoms. Examples of the arylene group include a phenylene group and a naphthalenediyl group. Examples of the substituent include an alkyl group having from 1 to 20 carbon atoms, and preferably from 1 to 6 carbon atoms. Examples of the substituent include a methyl group, an ethyl group, a propyl group, and the like.

The above-described compound is more preferably a compound in which X in the formula (2) is tetravalent, and which has the following structural formula (3).

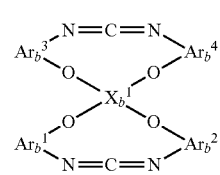

(3)

In the formula, $X_b^1$ is an alkanetetrayl group having preferably from 1 to 20 carbon atoms, more preferably from 1 to 10 carbon atoms, and still more preferably from 1 to 6 carbon atoms. Examples of the alkanetetrayl group include an isobutanetetrayl group, an isopentanetetrayl group, a neopentanetetrayl group, and the like. The alkanetetrayl group is preferably a neopentanetetrayl group.

Such a cyclic carbodiimide compound can be produced by a conventionally known method. Examples thereof include a method of production from an amine body via an isocyanate body; a method of production from an amine body via an isothiocyanate body; a method of production from an amine body via a triphenylphosphine body; a method of production from an amine body via a urea body; a method of production from an amine body via a thiourea body; a method of production from a carboxylic acid body via an isocyanate body; a method of production by inducing a lactam body; and the like.

In the manufacturing method of the present invention, it is preferred that the above-described carbodiimide is contained in the matrix resin together with the reinforcing fibers.

In the matrix resin which is used in the present invention, as described previously, the polyester-based resin having a crystallization temperature of 185° C. or lower is essential. Furthermore, in the manufacturing method of the present invention, it is preferred that other resin such as the above-described polycarbonate resin, or an additive such as the above-described carbodiimide is contained in the matrix resin.

In addition, other inorganic filler may be compounded in this matrix resin, in addition to the reinforcing fibers as an essential component. Examples of the inorganic filler may include talc, calcium silicate, wollastonite, montmorillonite, and various inorganic fillers. Furthermore, if desired, other additives which have hitherto been compounded in polyester-based resins, such as a heat-resistant stabilizer, an antistatic agent, a weather-resistant stabilizer, a light-resistant stabilizer, an anti-aging agent, an antioxidant, a softening agent, a dispersant, a filler, a colorant, and a lubricant, may be compounded in the above-described matrix resin.

Reinforcing fibers which are used for the manufacturing method of the present invention have only to be a fibrous material capable of reinforcing the matrix of the composite body, and inorganic fibers, such as carbon fibers with high strength and glass fibers, or organic synthetic fibers such as aromatic polyamide fibers, may be used. Above all, in order to obtain a composite body with high rigidity, more specifically, it is possible to exemplify carbon fibers such as polyacrylonitrile (PAN)-based carbon fibers, petroleum or coal pitch-based carbon fibers, rayon-based carbon fibers, and lignin-based carbon fibers. In particular, PAN-based carbon fibers made of PAN as a raw material are preferred because of excellent productivity on an industrial scale and mechanical properties.

As for a tex of the reinforcing fibers, it is suitable to use those having an average diameter of preferably from 3 to 12 μm, and more preferably from 5 to 10 μm. Within the foregoing range, not only the physical properties of the fibers are high, but also the dispersibility in the matrix is excellent. In addition, the reinforcing fibers are preferably a fiber bundle of from 1,000 to 50,000 monofilaments from the standpoint of productivity. Furthermore, the number of monofilaments constituting the fiber bundle is preferably in the range of from 3,000 to 40,000, and more preferably in the range of from 5,000 to 30,000.

In addition, for the purpose of reinforcing the resin, it is preferred that the strength of the fibers which are used for the composite body is higher, and it is preferred that the fibers has a tensile strength of form 3,500 MPa to 7,000 MPa and a modulus of from 220 GPa to 900 GPa. In that sense, from the viewpoint that a molded article with high strength is obtained, the fibers are preferably carbon fibers, and more preferably PAN-based carbon fibers.

As for a form of these fibers in the composite body, it is possible to use the fibers in a long-fiber or short-fiber form. However, from the viewpoint of reinforcing the resin, fibers having a long-fiber shape are preferred; and conversely, from the viewpoint that the physical properties of the composite body become isotropic such that anisotropy is hardly generated, a structural element mainly including short fibers is preferred. Here, the short fibers may be discontinuous fibers that are not long fibers. When used as short fibers, it is preferred to use the fibers as a fiber aggregate or non-woven fabric in which the fibers are randomly oriented in advance. In the case where the fibers are a long fiber, the fibers may be used in various forms such as a unidirectional sheet, a textile, a knitted goods, and a braid; however, from the standpoint of strength reinforcement of the composite body, it is preferred that the long fibers are partially used as a unidirectional sheet (so-called UD sheet) in the composite body, and a part of the reinforcing fibers is a unidirectional fiber sheet. As a most preferred form, it is preferred that the short fibers (discontinuous fibers) are randomly oriented in the structure, and a part of the reinforcing fibers is a unidirectional fiber sheet. Furthermore, it is also possible to partially use one kind or a combination of two or more kinds as such a fiber form.

In addition, in the case where the reinforcing fibers are short fibers (discontinuous fibers), a length thereof is preferably from 3 mm to 100 mm. The length is more preferably from 15 to 80 mm, and most preferably from 20 to 60 mm. In addition, in the case where the reinforcing fibers are used in a form such as a sheet-like form of non-woven fabric in advance, the reinforcing fibers are preferably a random mat in which discontinuous fibers having a fiber length of from 3 mm to 100 mm are randomly oriented. Furthermore, the reinforcing fibers are preferably in a form of a random mat in which discontinuous fibers are oriented substantially two-dimensionally randomly. By using a random mat, it becomes possible to obtain an isotropic composite material. Furthermore, when such disposition is taken, not only the strength and anisotropy to the dimensions are improved, but also the strength reinforcement due to the fibers are more efficiently exhibited. Incidentally, though the random mat referred to herein may be constituted of only carbon fibers, a resin working as the matrix may be intermingled as described later.

In addition, it is preferred to use reinforcing fibers, to surfaces of which a sizing agent has been attached prior to forming a structure with the matrix. As the sizing agent, epoxy-based or polyester-based sizing agents and the like may be used, and as for an attachment quantity thereof, the sizing agent is attached in an attachment quantity of preferably from 0 to 10 parts by weight, and more preferably from 0.2 to 2 parts by weight in terms of a dry weight based on 100 parts by weight of the fibers.

In addition, in company with giving the sizing agent, it is also preferred to separately subject the surfaces of the fibers to a surface treatment, whereby an effect for an enhancement of adhesiveness or the like may be obtained. For example, in the case of using carbon fibers as the reinforcing fibers, a liquid phase or vapor phase treatment or the like is preferably adopted, and particularly it is preferred to perform a liquid phase electrolysis surface treatment from the standpoints of productivity, stability, costs, and the like.

By giving the sizing agent to the reinforcing fibers or subjecting the reinforcing fibers to a surface treatment, not only handling properties or bundling properties may be improved especially when used as a reinforcing fiber bundle, but also adhesiveness or affinity between the reinforcing fibers and the matrix resin may be enhanced.

The method for manufacturing a composite material of the present invention is a manufacturing method in which it is essential to form a fiber matrix structure from the matrix mainly including a polyester-based resin and the reinforcing fibers as described above, followed by press molding.

As for the fiber matrix structure, it is preferred that the resin working as the matrix is in a granular or film-like form prior to the pressing step at the beginning. More specifically, especially in the case where the reinforcing fibers are short fibers (discontinuous fibers), it is preferred to prepare a structure by using a mixture including such reinforcing short fibers and the polyester-based resin having a granular or film-like shape. Incidentally, here, in the case where the resin is a granular material, it may take every form such as a fibrous form, a powdery form, and a needle-like form. In addition, it is preferred that the reinforcing fibers are in a fiber bundle shape from the standpoints of production efficiency and physical properties thereof.

Suitable examples of the fiber matrix structure using such reinforcing fibers may include the following random mat.

An average fiber length of the reinforcing fibers to be used for the random mat is preferably in the range of from 3 to 100 mm, more preferably in the range of from 15 to 80 mm, and most preferably in the range of from 20 to 60 mm, and the reinforcing fibers may be formed using one or a combination of two or more kinds of these fiber lengths.

In order to randomly dispose the reinforcing fibers, the fiber bundle is preferably one resulting from opening. The random mat is preferably one constituted of the fiber bundle made of short fibers and the polyester-based resin, in which the fibers are oriented in-plane randomly.

As for an existent amount of the fibers in the random mat, when the whole of the composite body is defined as 100, a proportion of the fibers is preferably from 10 to 90% by volume. The proportion of the fibers is more preferably from 15 to 80% by volume, and most preferably from 20 to 60% by volume.

It is possible to produce the random mat using such reinforcing fibers through, for example, the following specific steps.

(1) A step of cutting a reinforcing fiber bundle;
(2) a step of introducing the cut reinforcing fibers into a tube and blowing air onto the fibers, thereby opening the fiber bundle;
(3) an application step of diffusing the opened fibers and simultaneously spraying the fibers and a polyester-based resin at the same time while sucking together with the polyester-based resin; and
(4) a step of fixing the applied fibers and polyester-based resin.

In this process, in the step (3), besides spraying the polyester-based resin at the same time as described above, a step of spraying only the fibers and covering a polyester-based resin film having a thickness of from 10 μm to 300 μm thereon may also be adopted.

In the manufacturing method of the present invention, it is preferred to control a degree of opening of the fibers in the polyester-based resin matrix, thereby making a random mat including fibers existent in a fiber bundle and other opened fibers. By appropriately controlling an opening ratio, a random mat suitable for various applications and purposes may be provided.

The random mat may be obtained by, for example, cutting the fiber bundle and introducing the cut fiber bundles into a tapered tube, followed by blowing by allowing compressed air to flow thereinto. By preparing an appropriate random mat, it becomes possible to bring the fibers and the polyester-based resin into close contact with each other more minutely, thereby attaining high physical properties.

The method for manufacturing a composite material of the present invention is a method of press molding the fiber matrix structure as described above. Furthermore, the press molding is preferably cold pressing in which a die temperature in this press molding is lower than a temperature of the material as a subject to the pressing. As for a pressing condition, cold pressing in which the die temperature is 170° C. or lower is preferred. The die temperature is most preferably in the range of from 90° C. to 160° C. By performing the pressing at such a low temperature, it becomes possible to take away a product from the die simultaneously with completion of molding, and it becomes possible to secure high productivity. In general, the reinforcing fibers hardly flow in the press working under such a condition; however, according to the manufacturing method of the present invention, by using a polyester-based resin having a low crystallization temperature, it has become possible to obtain a composite body which has excellent moldability and in spite of high efficiency, has excellent physical properties.

In addition, it is preferred that the fiber matrix structure at the time of press molding is preheated in advance, and a temperature of the structure at that time is preferably a melting point thereof or higher. An upper limit thereof is preferably a temperature within 150° C. higher than the melting point. The temperature is more preferably within the range of from 20° C. to 100° C. higher than the melting point. A specific temperature is preferably in the range of from 220° C. to 320° C., and more preferably in the range of from 260° C. to 300° C. By preheating the fiber matrix structure in this way, it becomes possible to effectively perform the cold pressing.

As for the more preferred manufacturing method of the present invention, it is preferred to adopt a matrix resin in which an aromatic polycarbonate resin is allowed to coexist as the matrix resin in addition to the above-described polyester-based resin. The moldability was more enhanced by using an aromatic polycarbonate resin that is hardly crystalline and usually in an amorphous state in combination with a polyester-based resin that is easily crystalline. It has become possible to obtain a composite body which in spite of high efficiency, is more excellent in physical properties and surface appearance.

In the method for manufacturing a composite material of the present invention, the shape of the fiber matrix structure prior to pressing is preferably in a plate-like or sheet-like form in which the fiber matrix structure is easily made uniform. According to the manufacturing method of the present invention, in spite of the structure including fibers and a resin, a degree of freedom of the form at the time of press molding is high, and by using such a fiber matrix structure in a sheet-like form, it becomes possible to perform press molding in various shapes. In particular, the fiber matrix structure in a sheet-like form is optimally used for a shape having a bending part.

In addition, from the viewpoint of securing the degree of freedom of the working steps, it is preferred to perform preliminary press molding at a temperature of the melting point of the matrix resin or higher in advance prior to cold pressing. After the preliminary press molding, the plate-like shape is kept even at the time of movement, and thus, even in the case of adopting any step layout, it becomes possible to undergo stable production. An intermediate (composite body) having been subjected to such preliminary pressing is especially useful as an interim base material for cold pressing. For example, by superimposing two or more sheets of thin interim base materials and subjecting the plural sheets to cold pressing all at one, it becomes possible to produce composite materials having various shapes with ease.

Indeed, in order to increase the production efficiency, it is preferred to perform the method for manufacturing a composite material of the present invention by a continued one step, and in that case, it is preferred to adopt a method of subjecting the fiber matrix structure in a sheet-like form directly to cold pressing without performing the preliminary pressing step.

According to the manufacturing method of the present invention, by performing the above-described cold pressing, it has become possible to secure high productivity. Incidentally, in general, a polyester-based resin is high in crystallinity, and a crystallization temperature thereof is typically a high temperature higher than 185° C. In the case of press molding a fiber matrix structure using such a resin having a high crystallization temperature, the pressing temperature was high by all means, molding had to be performed by taking a lot of time, and thus, the productivity could not be enhanced. However, according to the present invention, by using the polyester-based resin in which the crystallizing temperature is kept low, it has become possible to perform press molding with high efficiency.

In addition, astonishingly, in spite of using the resin in which the crystallization temperature is made low in this way, according to the manufacturing method of the present invention, it has become possible to secure physical properties such as heat resistance substantially equal to those of a conventional polyester-based resin having a high crystallization temperature. This is especially remarkable in the case of using carbon fibers as a random mat for reinforcing fibers, and it may be considered that the presence of the reinforcing fibers which are randomly but uniformly dispersed as a whole greatly contributes to this matter.

In addition, in the manufacturing method of the present invention, though it is preferred that the discontinuous fibers are randomly oriented in the fiber matrix structure, it is more preferred that a part of the reinforcing fibers is a unidirectional fiber sheet. By disposing such a unidirectional fiber sheet in, for example, a portion with weak strength or a portion forming a corner in a final molded body and performing press molding, as compared with the case of using only a random mat, it becomes possible to prepare a molded article with higher strength.

The shape of a final molded article using the composite material obtained in the present invention is preferably a cylindrical or prismatic shape in addition to a simple plate-like shape. In addition, it is also preferred to adopt a shape so as to form a cylindrical or prismatic shape by plural parts. According to the composite material of the present invention, in spite of the polyester-based resin reinforced with fibers, the degree of freedom for imparting a shape at the time of press molding, and it becomes possible to provide a deep-drawn product thereof.

Furthermore, in the case where the composite material obtained by the manufacturing method of the present invention contains an aromatic polycarbonate resin in the matrix resin, after integrating by press molding, the resultant becomes a material satisfying not only an extremely high surface appearance (gloss) but also high physical properties, especially physical properties at high temperatures. Then, the composite material obtained by the manufacturing method of the present invention is excellent in design properties and may be optimally used especially in a part which a person directly touches, such as automobile interior materials.

Furthermore, it is preferred that this composite material of the present invention contains a cyclic carbodiimide in the matrix resin. As the cyclic carbodiimide or the like as used herein, the same materials as those used in the above-described manufacturing method may be adopted.

Furthermore, the cyclic carbodiimide is preferably a cyclic carbodiimide compound which is a compound having two cyclic structures and in which one carbodiimide group is present in each one cyclic structure. Incidentally, though the matrix resin is one mainly including a polyester-based resin having a crystallization temperature of 185° C. or lower, it is further preferably a copolymer resin containing a terephthalic acid component and an isophthalic acid component or a resin mainly including a polybutylene terephthalate component. Meanwhile, the reinforcing fibers are preferably carbon fibers, and especially preferably fibers mainly including discontinuous fibers. Then, such a fiber-reinforced composite material is used in a shape as it is, and besides, it may also be suitably used as an interim base material for press molding, whereby a material excellent in moldability and physical properties is revealed.

Then, in the case where the composite material obtained by the manufacturing method of the present invention contains a cyclic carbodiimide as a preferred embodiment, the resulting composite body becomes a composite material excellent in humidity resistance. In particular, high durability satisfactory even under a high-temperature and high-humidity condition is obtained.

Such a composite material obtained by the manufacturing method of the present invention becomes a material satisfactory in extremely high physical properties because it is constituted of a polyester-based resin having excellent physical properties and reinforcing fibers and it is integrated by the press molding. In particular, with respect to the chemical resistance, the composite material is excellent in durability against not only acids and alkalis but also metal chlorides such as calcium chloride and zinc chloride, and it becomes possible to use the composite material for various applications.

The composite material obtained by the manufacturing method of the present invention may be especially optimally used as a composite material to be used under a severe condition as in vehicle structures, outdoor structures, or the like.

EXAMPLES

The present invention is hereunder explained in more detail by reference to Examples, but it should not be construed that the present invention is limited to the following Examples. Incidentally, the Examples of the present invention were evaluated by the following methods.

<Measurement of Crystallization Temperature and Melting Point>

5 g of a sample was collected, and the sample was melted at a temperature rise rate of 10° C./min from ordinary temperature to 250° C. using a differential scanning calorimeter (X-DSC7000, manufactured by Seiko Instruments Inc.), to measure a melting point. Thereafter, the sample was cooled at a temperature dropping rate of 10° C./min from 250° C. to ordinary temperature, to measure a crystallization temperature.

<Measurement of Terminal Carboxylic Acid Concentration>

A polymer in an amount of 0.1 g was dissolved in 10 mL of benzyl alcohol, to which was then further added 10 mL of benzyl alcohol, thereby preparing a solution. To the solution, a 0.02 N sodium hydroxide aqueous solution was added, thereby performing titration. Phenol Red was used as an indicator.

<Measurement of Intrinsic Viscosity IV>

A polymer in an amount of 0.12 g was dissolved in 15 mL of a mixed solvent of phenol and trichloroethylene (phenol/trichloroethylene=60/40), thereby preparing a solution. The solution was measured at 35° C. using a Ubbelohde viscometer.

<Measurement of Rate of Impregnation>

First of all, 15 g of a matrix resin for impregnation was put into a silicon rubber-made mold which had been cut out a pattern of 10×10×2 mm and subjected to heat press molding at a preset temperature of 250° C., thereby preparing a resin sheet having a thickness of 2 mm.

Meanwhile, a carbon fiber mat having a thickness of about 0.33 mm in an unmolded state was obtained by using a carbon fiber strand ("TENAX STS-24K N00", manufactured by Toho Tenax Co., Ltd., 7 μm (diameter)×24,000 filaments) which had been cut in a size of 20 mm. Then, this carbon fiber mat was cut out in a size of 10 cm×10 cm, six sheets were stacked to form a stacked mat having a thickness of about 2 mm and a weight of about 12 g, and the weight was precisely measured.

The above-described resin sheet was superimposed on the resulting stacked mat, and the resultant was heated and pressurized by a hot press at a press pressure of 65 kgf and a press temperature of 300° C. for 3 minutes, thereby preparing a carbon fiber mat in which the resin was partially impregnated.

The carbon fibers in which the resin was not impregnated were removed, and a rate of impregnation of the matrix resin relative to the carbon fiber mat was calculated according to the following equation.

Rate of impregnation (%)=[(weight of initial stacked mat)−(weight of removed carbon fibers)]/(weight of initial stacked mat)

<Die Filling Ratio 1>

For preliminary pressing, an interim base material including reinforcing fibers and a matrix resin and having a length of 195 mm, a width of 95 mm, and a thickness of 2 mm was prepared under a temperature condition at 260° C. Subsequently, this interim base material was preheated such that its temperature reached 300° C. and then subjected to cold pressing in a die having a length of 230 mm, a width of 100 mm, and a thickness of 1.6 mm at a temperature of 130° C. In the case where the interim base material was filled entirely in the die for cold pressing, the die filling ratio is defined as 100%, and in the case where the area of the interim base material did not change, the die filling ratio is defined as 0%, thereby evaluating cold pressing moldability.

<Die Filling Ratio 2>

The size of the interim base material of the above-described die filling ratio 1 was changed to 180 mm in length, 90 mm in width, and 2 mm in thickness, respectively, thereby preparing a slightly smaller interim base material. Simultaneously, the cold pressing moldability was evaluated under the same condition as that in the die filling ratio 1, except that the size of the die was changed to 230 mm in length, 100 mm in width, and 1.5 mm in thickness, respectively.

<Moisture Resistance (PCT: 48 Hours)>(PCT (Pressure Cooker Test) Humidification Treatment Condition)

Pellets obtained by compounding were charged in a pressure cooker tester and treated under a condition at 121° C. and 100% RH for 48 hours, thereby measuring a terminal carboxylic acid concentration (unit: eq/ton) and an IV (intrinsic viscosity) holding ratio (unit: %).

<Physical Properties of Base Material>

As for physical properties of the composite material, a specimen having a shape of 250×25 mm was prepared. Using this specimen, tensile strength and flexural strength were measured in conformity with JIS K7164. Flexural strength was measured in conformity with JIS K7074. Incidentally, the measurement was typically performed at 23° C. and partially performed at 80° C. as a high-temperature condition.

<Surface Gloss>

A flat board of 10 cm×10 cm was cut out from the above-described interim base material, thereby preparing a measuring sample. Surface gloss was measured in conformity with JIS Z8741. Incidentally, the measurement was performed at a light incidence angle of 60°.

Example 1

A carbon fiber bundle was used as reinforcing fibers. That is, a carbon fiber strand ("TENAX STS-24K N00", manufactured by Toho Tenax Co., Ltd., 7 μm (diameter)×24,000 filaments, tex: 1.6 g/m, tensile strength: 4,000 MPa (408 kgf/mm$^2$), tensile modulus: 238 GPa (24.3 tons/mm$^2$)) was continuously dipped in an epoxy-based sizing agent, allowed to pass through a drying furnace at 130° C. for about 120 seconds, and then dried and heated, thereby obtaining a carbon fiber bundle having a width of about 12 mm. An attachment quantity of the sizing agent was 1% by weight.

Subsequently, a random mat was prepared using the resulting carbon fiber bundle. As reinforcing fibers, those resulting from cutting the above-described carbon fiber bundle into a size of 20 mm were used. As a matrix resin, a polybutylene terephthalate/isophthalate copolymer (hereinafter referred to as "PBT/IA copolymer") having a ratio of terephthalic acid to isophthalic acid of 90/10 mol % was used. A rate of impregnation of this matrix resin into the carbon fiber mat was so excellent as 71%. In addition, this matrix resin had a crystallization temperature of 169° C., a melting point of 210° C., and an intrinsic viscosity of 1.00.

First of all, pellets of the matrix resin were frozen and crushed, and further classified with 20 mesh and 30 mesh sieves, thereby preparing a powder having an average particle diameter of about 1 mm.

Then, the fibers and the PBT/IA copolymer resin powder were introduced into a tapered tube, and air was blown into the carbon fibers, thereby spraying the carbon fibers together with the PBT/IA copolymer resin powder onto a table placed in a lower part of an outlet of the tapered tube while partially opening the fiber bundle. The sprayed carbon fibers and PBT/IA copolymer resin powder were sucked by a blower from a lower part of the table and fixed, thereby obtaining a carbon fiber random mat in an unmolded state having a thickness of about 5 mm.

The resulting carbon fiber random mat was subjected to a preliminary pressing step using a pressing apparatus heated at 260° C., thereby obtaining an interim base material (composite material) having a fiber volume fraction (Vf) of 35 vol % (length: 195 mm, width: 95 mm, thickness: 2 mm, weight: 52 g). This had high physical properties such that the tensile strength was 320 MPa, the flexural strength was 410 MPa, and the flexural modulus was 24 GPa.

One sheet of this interim base material was subjected to temperature rise until it reached 300° C., and then subjected to cold pressing using a die having a shape of a length of 230 mm, a width of 100 mm, and a thickness of 1.6 mm at a die temperature of 130° C., thereby obtaining a molded article (composite material). The matrix resin and the reinforcing fibers were randomly disposed into corner portions of the die, and the molded article (composite material) having high uniformity could be obtained. In addition, the resulting molded article was a composite body free from a lowering in the physical properties by cold pressing and having high durability against all of chemicals including acids, alkalis, and calcium chloride.

The obtained physical properties are shown in Table 1.

Examples 2 to 4

Intermediates and shaped products (composite bodies) were prepared in the same manners as those in Example 1, except that as for the PBT/IA copolymer, the ratio of terephthalic acid to isophthalic acid of 90/10 mol % in Example 1 was changed to one of the matrix resin as shown in Table 1. The obtained physical properties are also shown in Table 1.

Comparative Example 1

An intermediate and a shaped product (composite body) were prepared in the same manners as those in Example 1, except that the matrix resin was changed to a polybutylene terephthalate resin (DURANEX 700FP, manufactured by Polyplastics Co., Ltd.) in place of the PBT/IA copolymer in Example 1. A rate of impregnation of this matrix resin into the carbon fiber mat was only 60%. Furthermore, a die filling ratio at the time of press working was only less than 30%, and cold press molding could not be achieved. The obtained physical properties are also shown in Table 1.

Example 5

On the interim base material including reinforcing fibers and a polyester-based resin as obtained in Example 1, a unidirectional sheet (UD sheet) including unidirectionally paralleled carbon fibers and a polyester-based resin of a PBT/IA copolymer (ratio of terephthalic acid to isophthalic acid=90/10 mol %) the same as that used in the above-described interim base material was superimposed, and the resultant was subjected to cold pressing under the same condition as that in Example 1, thereby obtaining a composite material having a two-layer structure of the random web and the unidirectional sheet. There was obtained the composite material with more enhanced strength.

Example 6

As the polyester-based resin in the matrix resin component, the polybutylene terephthalate/isophthalate copolymer (hereinafter referred to as "PBT/IA copolymer") used in Example 3 and having a ratio of terephthalic acid to isophthalic acid of 80/20 mol % was prepared. 80% by weight of this polyester-based resin was compounded with 20% by weight of an aromatic polycarbonate resin ("PANLITE L-1250Y", manufactured by Teijin Chemical Ltd.) by using a twin-screw melt kneader, thereby preparing a matrix resin.

Meanwhile, as reinforcing fibers, a carbon fiber bundle (carbon fiber strand, "TENAX STS-24K N00", manufactured by Toho Tenax Co., Ltd., 7 μm (diameter)×24,000 filaments) was continuously dipped in an epoxy-based sizing agent, allowed to pass through a drying furnace at 130° C. for about 120 seconds, and then dried and heated, thereby preparing a carbon fiber bundle having a width of about 12 mm. At this time, an attachment quantity of the sizing agent to the carbon fiber bundle was 1% by weight.

Using these matrix resin and reinforcing fibers, a carbon fiber random mat having a thickness of about 5 mm was obtained in the same manner as that in Example 1.

The resulting carbon fiber random mat was subjected to a preliminary pressing step using a pressing apparatus heated at 260° C., thereby obtaining an interim base material (composite material) having a fiber volume fraction (Vf) of 35 vol %.

The physical properties of the resulting interim base material were 340 MPa at ordinary temperature and 270 MPa in an atmosphere at 80° C., respectively. As a result of measuring the flexural strength, it was 280 MPa at ordinary temperature. In addition, the interim base material was cut out into a flat board of 10 cm×10 cm and measured for surface gloss. The surface gloss was 60. In addition, the resulting molded article was a composite body free from a lowering in the physical properties by cold pressing and having high durability against all of chemicals including acids, alkalis, and calcium chloride.

The obtained physical properties are shown in Table 2.

In addition, as comparison, the data of Example 3 in which the content of the aromatic polycarbonate resin in the matrix resin is 0% by weight (the PC resin content of Example 6 is 20% by weight) are also shown in Table 2. Though Example 3 is excellent in die filling ratio, physical

TABLE 1

| | Example 1 | Example 2 | Example 3 | Example 4 | Comparative Example 1 |
|---|---|---|---|---|---|
| Reinforcing fibers | Carbon fibers | Carbon fibers | Carbon fibers | Carbon fibers | Carbon fibers |
| | | PES resin | | | |
| TA/IA content | 90/10 | 85/15 | 80/20 | 95/5 | 100/0 |
| Crystallization temperature (° C.) | 169 | 156 | 142 | 179 | 189 |
| Melting point (° C.) | 210 | 202 | 193 | 219 | 225 |
| Intrinsic viscosity | 1.00 | 1.03 | 1.02 | 0.82 | 1.14 |
| Rate of impregnation (%) | 71 | 75 | 76 | 70 | 60 |
| | Physical properties of base material | | | | |
| Tensile strength (MPa) | 320 | 310 | 310 | 320 | 330 |
| Flexural strength (MPa) | 410 | 400 | 400 | 410 | 420 |
| Die filling ratio 1 (%) | 85 | 100 | 100 | 80 | <30 |

PES: Polyester-based resin properties, and the like, it is low in surface gloss as compared with Example 6, and as for the appearance, Example 6 was more excellent.

Example 7

An interim base material and a composite body having been subjected to cold pressing were obtained in the same manners as those in Example 6 by using the same polyester resin having a content of isophthalic acid of 20 mol % as used in Example 6, except that in Example 6, the content of the aromatic polycarbonate resin in the matrix resin was changed from 20% by weight to 40% by weight. A rate of impregnation of this matrix resin into the carbon fiber mat was so excellent as 74%. The results are also shown in Table 2.

TABLE 2

|  | Example 3 | Example 6 | Example 7 |
|---|---|---|---|
| Reinforcing fibers | Carbon fibers PES resin | Carbon fibers | Carbon fibers |
| TA/IA content | 80/20 | 80/20 | 80/20 |
| Crystallization temperature (° C.) | 142 | 142 | 142 |
| PES/PC ratio | 100/0 | 80/20 | 60/40 |
| Physical properties of base material (MPa) | | | |
| Tensile strength at 23° C. | 310 | 340 | 330 |
| Tensile strength at 80° C. | 230 | 270 | 300 |
| Flexural strength at 80° C. | 240 | 280 | 330 |
| Appearance: Surface gloss | 40 | 60 | 80 |
| Die filling ratio 1 (%) | 100 | 100 | 100 |

PES: Polyester-based resin
PC: Aromatic polycarbonate resin

Example 8

An interim base material and a composite body having been subjected to cold pressing were obtained in the same manners as those in Example 7 in which the content of the aromatic polycarbonate resin was 40% by weight, except that a PBT/IA copolymer having a ratio of terephthalic acid to isophthalic acid of 90/10 mol % was used as the polyester-based resin in the matrix resin in place of the polyester-based resin having a content of isophthalic acid of 20 mol % as used in Example 7. The results are also shown in Table 3.

Example 9

An interim base material and a composite body having been subjected to cold pressing were obtained in the same manners as those in Example 6, except that a linear carbodiimide ("Stabaxol P", manufactured by Rhein Chemie Japan Ltd.) was added as a third component of the matrix resin.

As a result of measuring the humidity resistance (holding ratio of intrinsic viscosity) of the matrix resin thereof, it was 95%, a value of which was remarkably enhanced as compared with 50% in Example 6. Here, the humidity resistance is one resulting from performing an acceleration test using a pressure cooker test and comparing the measured value (intrinsic viscosity) before and after the treatment. As for an acceleration test condition, the test was performed under a condition at 120° C. and 100% RH for 48 hours (humidity resistance PCT test).

The results are also shown in Table 3.

Example 10

An interim base material and a composite body having been subjected to cold pressing were obtained in the same manners as those in Example 6, except that 90% by weight of the polyester-based resin having a ratio of terephthalic acid to isophthalic acid of 80/20 mol % as used in Example 6 was used as the polyester-based resin in the matrix resin, 10 parts by weight of a polyester elastomer ("HYTREL 4767", manufactured by Du Pont-Toray Co., Ltd.) was used for the balance of 10% by weight, and the aromatic polycarbonate resin was not used. That is, this is corresponding to an elastomer additional content fraction of Example 3 as described above. Not only Example 10 is excellent in die filling ratio, physical properties, and the like, but also since this uses an elastomer, Example 10 was more excellent in surface gloss than Example 3. However, as for the high-temperature physical properties at 80° C., Example 10 was lower than not only Example 6 but also Example 3. The results are also shown in Table 3.

Example 11

On the interim base material including reinforcing fibers and a matrix resin as obtained in Example 6, a unidirectional sheet (UD sheet) including unidirectionally paralleled carbon fibers and the same matrix resin as that used in the interim base material in Example 6 as described above, and the resultant was subjected to cold pressing under the same condition as that in Example 6, thereby obtaining a composite material having a two-layer structure of the random web and the unidirectional sheet. There was obtained the composite material with more enhanced strength.

TABLE 3

|  | Example 8 | Example 9 | Example 10 |
|---|---|---|---|
| Reinforcing fibers | Carbon fibers PES resin | Carbon fibers | Carbon fibers |
| TA/IA content | 90/10 | 80/20 | 80/20 |
| Crystallization temperature (° C.) | 169 | 142 | 142 |
| PES/PC ratio | 60/40 | 79/20 | 90/0 |
| Other component (addition part) | — | CI (1 part) | EL (10 parts) |
| Physical properties of base material (MPa) | | | |
| Tensile strength at 23° C. | 350 | 340 | 310 |
| Tensile strength at 80° C. | 315 | 260 | 210 |
| Flexural strength at 80° C. | 335 | 280 | 220 |
| Appearance: Surface gloss | 75 | 75 | 80 |
| Die filling ratio 1 (%) | 85 | 85 | 100 |

PES: Polyester-based resin
PC: Aromatic polycarbonate resin
CI: Carbodiimide
EL: Elastomer Reference Example 1

A cyclic carbodiimide compound was obtained by the following steps.

First of all, in a reaction apparatus equipped with a stirring device and a heating device, o-nitrophenol (0.11 moles), pentaerythrityl tetrabromide (0.025 moles), potassium carbonate (0.33 moles), and 200 mL of N,N-dimethylformamide were charged in an $N_2$ atmosphere and allowed to react with each other at 130° C. for 12 hours; thereafter, DMF was removed under reduced pressure; the resulting solid was dissolved in 200 mL of dichloromethane; and the solution was subjected to liquid separation with 100 mL of water three times. An organic layer was dehydrated with 5 g of sodium sulfate, and the dichloromethane was removed under reduced pressure, thereby obtaining an intermediate A (nitro body).

Subsequently, in a reaction apparatus equipped with a stirring device, the intermediate A (0.1 moles), 5% palladium carbon (Pd/C) (2 g), and 400 mL of ethanol/dichloromethane (70/30) were charged and subjected to hydrogen displacement 5 times; the resultant was allowed to react at 25° C. in a state of always feeding hydrogen; and when a decrease of hydrogen disappeared, the reaction was terminated. The Pd/C was recovered, and the mixed solvent was removed, thereby obtaining an intermediate B (amine body).

Subsequently, in a reaction apparatus equipped with a stirring device, a heating device, and a dropping funnel, triphenylphosphine dibromide (0.11 moles) and 150 mL of 1,2-dichloroethane were charged in an $N_2$ atmosphere, followed by stirring. A solution of the intermediate B (0.025 moles) and triethylamine (0.25 moles) in 50 mL of 1,2-dichloroethane was gradually added dropwise thereto at 25° C. After completion of the dropwise addition, the mixture was allowed to react at 70° C. for 5 hours. Thereafter, the reaction solution was filtered, and the filtrate was subjected to liquid separation with 100 mL of water five times. An organic layer was dehydrated with 5 g of sodium sulfate, and the 1,2-dichloroethane was removed under reduced pressure, thereby obtaining an intermediate C (triphenylphosphine body).

Subsequently, in a reaction apparatus equipped with a stirring device and a dropping funnel, di-tert-butyl dicarbonate (0.11 moles), N,N-dimethyl-4-amino-pyridine (0.055 moles), and 150 mL of dichloromethane were charged in an $N_2$ atmosphere, followed by stirring. 100 mL of dichloromethane having the intermediate C (0.025 moles) dissolved therein was slowly added dropwise thereto at 25° C. After the dropwise addition, the mixture was allowed to react with each other for 12 hours. Thereafter, the dichloromethane was removed, and the resulting solid was purified, thereby obtaining a cyclic carbodiimide compound. As a result of confirming a structure of this cyclic carbodiimide compound by means of NMR and IR, it was confirmed to have a structure represented by the following chemical formula (4).

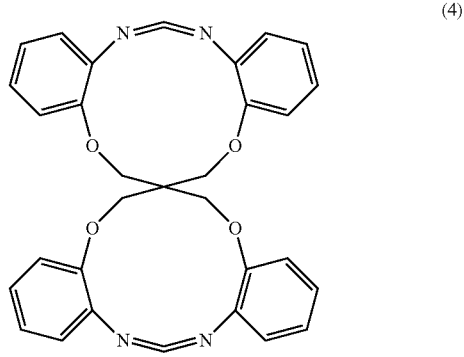 [SMILES: C1=Nc2ccccc2OCC2(COc3ccccc3N=1)COc1ccccc1N=C=Nc1ccccc1OC2]

(4)

Example 12

As a matrix resin, a polyester-based resin that is a polybutylene terephthalate/isophthalate copolymer (PBT/IA copolymer) having a ratio of terephthalic acid to isophthalic acid of 90/10 mol % was prepared. To 99% by weight of this polyester-based resin, 1% by weight of the cyclic carbodiimide represented by the foregoing formula (4) as obtained in the Reference Example was added to prepare a matrix resin. That is, using a twin-screw melt kneader, a prescribed amount of the cyclic carbodiimide was added to the matrix resin at a cylinder temperature of 260° C., and the mixture was compounded to obtain pellets of the matrix resin. At this time, the compounded product had an intrinsic viscosity of 1.13.

Meanwhile, as reinforcing fibers, a carbon fiber bundle (carbon fiber strand, "TENAX STS-24K N00", manufactured by Toho Tenax Co., Ltd., 7 μm (diameter)×24,000 filaments) was continuously dipped in an epoxy-based sizing agent, allowed to pass through a drying furnace at 130° C. for about 120 seconds, and then dried and heated, thereby preparing a carbon fiber bundle having a width of about 12 mm. At this time, an attachment quantity of the sizing agent to the carbon fiber bundle was 1% by weight.

Using these matrix resin and reinforcing fibers, a carbon fiber random mat having a thickness of about 5 mm was obtained in the same manner as that in Example 1.

The resulting carbon fiber random mat was subjected to a preliminary pressing step using a pressing apparatus heated at 260° C., thereby obtaining an interim base material (composite material) having a fiber volume fraction (Vf) of 35 vol % (length: 195 mm, width: 95 mm, thickness: 2 mm, weight: 52 g). This had a tensile strength of 340 MPa and a flexural strength of 420 MPa.

One sheet of this interim base material was subjected to temperature rise until it reached 300° C., and then subjected to cold pressing using a die having a shape of a length of 230 mm, a width of 100 mm, and a thickness of 1.6 mm at a die temperature of 130° C., thereby obtaining a molded article (composite material). The matrix resin and the reinforcing fibers were randomly disposed into corner portions of the die, and the molded article (composite material) having high uniformity could be obtained. In addition, the resulting molded article was a composite body free from a lowering in the physical properties by cold pressing and having high durability against all of chemicals including acids, alkalis, and calcium chloride.

The obtained physical properties are shown in Tables 4 and 6.

Example 13

A polyester-based resin having a ratio of terephthalic acid to isophthalic acid of 80/20 mol % was prepared in place of the PBT/IA copolymer (ratio of terephthalic acid to isophthalic acid=90/10 mol %) that is the matrix resin in Example 12. Besides, the same procedures as those in Example 12 were followed, thereby obtaining a compounded product of pellets of the matrix resin having the cyclic carbodiimide added thereto. This had an intrinsic viscosity of 1.13.

Furthermore, an interim base material and a composite body having been subjected to cold pressing were obtained in the same manners as those in Example 12. The results are also shown in Table 4.

Example 14

An interim base material and a composite body having been subjected to cold pressing were obtained in the same manners as those in Example 13, except that the addition amount of the cyclic carbodiimide in Example 13 was changed from 1 part by weight to 0.5 parts by weight. The results are also shown in Table 4.

In addition, as comparison, the data of Example 3 in which the carbodiimide was not added in the matrix resin are also shown in Table 3. The die filling ratio and the physical properties of the base material were excellent values. However, the terminal carboxylic acid concentration after 48 hours of PCT increased to 95 eq/ton, and the IV holding ratio was only 40%. As compared with Examples 13 and 14 using the same matrix resin, the humidity resistance properties were deteriorated.

TABLE 4

|  | Example 12 | Example 13 | Example 14 | (Example 3) |
|---|---|---|---|---|
| Reinforcing fibers | Carbon fibers | Carbon fibers | Carbon fibers | Carbon fibers |
| | | PES resin | | |
| TA/IA content | 90/10 | 80/20 | 80/20 | 80/20 |
| Crystallization temperature (° C.) | 169 | 142 | 142 | 142 |
| Amount of matrix resin | 99 parts | 99 parts | 99.5 parts | 100 parts |
| Amount of cyclic carbodiimide | 1 part | 1 part | 0.5 parts | — |
| | Physical properties of base material | | | |
| Tensile strength (MPa) | 340 | 340 | 340 | 310 |
| Flexural strength (MPa) | 420 | 410 | 415 | 400 |
| | Humidity resistance, after 48 hours of PCT | | | |
| Terminal carboxylic acid concentration | 2 eq/ton | 1 eq/ton | 5 eq/ton | 95 eq/ton |
| IV holding ratio | 98% | 95% | 90% | 40% |
| | Moldability | | | |
| Die filling ratio 2 | 85% | 95% | 95% | 95% |

Comparative Example 2

An interim base material and a composite body having been subjected to cold pressing were obtained in the same manners as those in Comparative Example 1, except that 1 part by weight of a general linear carbodiimide ("Stabaxol P", manufactured by Rhein Chemie Japan Ltd.) was added as the carbodiimide to the polybutylene terephthalate resin (polyester-based resin) used as the matrix resin in Comparative Example 1. The terminal carboxylic acid concentration after 48 hours of PCT was 20 eq/ton and enhanced as compared with Comparative Example 1 not using the carbodiimide; however, a sufficient effect was not obtained as compared with Examples 12 to 14 using the cyclic carbodiimide. The results are shown in Table 5.

In addition, as comparison, the data of Comparative Example 1 in which the carbodiimide was not added in the matrix resin are also shown in Table 5. In all the cases, the terminal carboxylic acid concentration after 48 hours of PCT increased to 90 eq/ton, and as compared with Comparative Example 2, the humidity resistance properties were deteriorated.

TABLE 5

|  | (Comparative Example 1) | Comparative Example 2 |
|---|---|---|
| Reinforcing fibers | Carbon fibers | Carbon fibers |
| | PES resin | |
| TA/IA content | 100/0 | 100/0 |
| Crystallization temperature (° C.) | 189 | 189 |
| Amount of matrix resin | 100 parts | 99 parts |
| Amount of cyclic carbodiimide | — | — |
| Amount of linear carbodiimide | — | 1 part |
| | Physical properties of base material | |
| Tensile strength (MPa) | 330 | 360 |
| Flexural strength (MPa) | 420 | 420 |
| | Humidity resistance, after 48 hours of PCT | |
| Terminal carboxylic acid concentration (eq/ton) | 90 eq/ton | 20 eq/ton |
| IV holding ratio (%) | 40% | 65% |
| | Moldability | |
| Die filling ratio 2 (%) | 30% | 35% |

Example 15

On the interim base material including reinforcing fibers and a polyester-based resin as obtained in Example 12, a unidirectional sheet (UD sheet) including unidirectionally paralleled carbon fibers and a polyester-based resin of a PBT/IA copolymer (ratio of terephthalic acid to isophthalic acid=90/10 mol %) the same as that used in the above-described interim base material, and the resultant was subjected to cold pressing under the same condition as that in Example 12, thereby obtaining a composite material having a two-layer structure of the random web and the unidirectional sheet. There was obtained the composite material with more enhanced strength.

Examples 16 to 18

The matrix resin having a cyclic carbodiimide added thereto in Example 12 was changed to one having a formulation shown in Table 6. That is, a compounded product of pellets of the matrix resin was obtained in the same manner as that in Example 12, except that an elastomer was added as a third component. Subsequently, an interim base material and a composite body having been subjected to cold pressing were obtained in the same manners as those in Example 12.

Incidentally, as the elastomer which was added as the third component in the matrix resin, an acrylic compound (acrylic elastomer "C-223A", manufactured by Mitsubishi Rayon Co., Ltd.) was used in Examples 16 and 17, and a polyester compound (polyester-based elastomer "HYTREL 4767", manufactured by Du Pont-Toray Co., Ltd.) was used in Example 18.

The results are shown in Table 6.

TABLE 6

|  | (Example 12) | Example 16 | Example 17 | Example 18 |
|---|---|---|---|---|
| Reinforcing fibers | Carbon fibers | Carbon fibers | Carbon fibers | Carbon fibers |
| | PES resin | | | |
| TA/IA content | 90/10 | 90/10 | 80/20 | 90/10 |
| Crystallization temperature (° C.) | 169 | 169 | 142 | 169 |
| Amount of matrix resin | 99 parts | 94 parts | 94 parts | 94 parts |
| Amount of cyclic carbodiimide | 1 part | 1 part | 1 part | 1 part |

TABLE 6-continued

| | (Example 12) | Example 16 | Example 17 | Example 18 |
|---|---|---|---|---|
| Amount of acrylic elastomer | — | 5 parts | 5 parts | — |
| Amount of polyester-based elastomer | — | — | — | 5 parts |
| Physical properties of base material | | | | |
| Tensile strength (MPa) | 340 | 310 | 315 | 310 |
| Flexural strength (MPa) | 420 | 385 | 380 | 380 |
| Humidity resistance, after 48 hours of PCT | | | | |
| Terminal carboxylic acid concentration | 2 eq/ton | 3 eq/ton | 2 eq/ton | 3 eq/ton |
| IV holding ratio | 98% | 98% | 90% | 90% |
| Moldability | | | | |
| Die filling ratio 2 | 85% | 98% | 98% | 98% |

The invention claimed is:

1. A method for manufacturing a composite material, comprising performing press molding of a fiber matrix structure sheet including reinforcing fibers and a matrix resin which mainly includes a polyester-based resin having a crystallization temperature of 185° C. or lower,
wherein the press molding is cold pressing,
wherein preliminary press molding is performed in advance prior to the cold pressing of the fiber matrix structure sheet,
wherein the matrix resin prior to the preliminary press molding is in a granular form,
wherein the reinforcing fibers prior to the preliminary press molding are in a fiber bundle shape,
after the preliminary press molding, the fiber matrix structure becomes an interim base material for the cold pressing,
wherein a length of the reinforcing fibers is from 20 to 100 mm, and
wherein the reinforcing fibers include fibers in a fiber bundle shape and opened fibers.

2. The method for manufacturing a composite material according to claim 1, wherein the polyester-based resin is a polyester-based copolymer.

3. The method for manufacturing a composite material according to claim 1, wherein the polyester-based resin is a resin mainly including a polybutylene terephthalate component.

4. The method for manufacturing a composite material according to claim 1, wherein the polyester-based resin is a copolymer resin including a terephthalic acid component and an isophthalic acid component.

5. The method for manufacturing a composite material according to claim 1, wherein the matrix resin includes a carbodiimide.

6. The method for manufacturing a composite material according to claim 5, wherein the carbodiimide has a structure represented by the following chemical formula (1):

(1)

wherein Q is a divalent, trivalent, or tetravalent binding bond that is an aliphatic group, an alicyclic group, an aromatic group, or a combination thereof, which may include a hetero atom.

7. The method for manufacturing a composite material according to claim 1, wherein the press molding is cold pressing in which a die temperature is 170° C. or lower.

8. The method for manufacturing a composite material according to claim 1, wherein a temperature of the fiber matrix structure at the time of the press molding is a melting point of the matrix resin or higher.

9. The method for manufacturing a composite material according to claim 1, wherein the reinforcing fibers are carbon fibers.

10. The method for manufacturing a composite material according to claim 1, wherein the reinforcing fibers are fibers mainly including discontinuous fibers.

11. The method for manufacturing a composite material according to claim 10, wherein the discontinuous fibers are randomly oriented in the structure.

12. A method for manufacturing a composite material according to claim 1, wherein a fiber bundle of the reinforcing fibers in the fiber bundle shape includes from 1,000 to 50,000 monofilaments.

* * * * *